US011026110B2

(12) United States Patent
Bergström et al.

(10) Patent No.: US 11,026,110 B2
(45) Date of Patent: Jun. 1, 2021

(54) INTER-RAT MEASUREMENT REPORTING

(71) Applicant: Telefonaktiebolaget LM Ericsson (publ), Stockholm (SE)

(72) Inventors: Mattias Bergström, Stockholm (SE); Helka-Liina Määttanen, Helsinki (FI)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 15/741,878

(22) PCT Filed: Jul. 6, 2016

(86) PCT No.: PCT/SE2016/050690
§ 371 (c)(1),
(2) Date: Jan. 4, 2018

(87) PCT Pub. No.: WO2017/007414
PCT Pub. Date: Jan. 12, 2017

(65) Prior Publication Data
US 2018/0199222 A1    Jul. 12, 2018

Related U.S. Application Data

(60) Provisional application No. 62/189,761, filed on Jul. 8, 2015.

(51) Int. Cl.
*H04W 24/10* (2009.01)
*H04W 48/18* (2009.01)
(Continued)

(52) U.S. Cl.
CPC ............. *H04W 24/10* (2013.01); *H04W 8/08* (2013.01); *H04W 48/18* (2013.01); *H04W 88/06* (2013.01); *H04W 12/06* (2013.01)

(58) Field of Classification Search
CPC ....... H04W 24/10; H04W 88/06; H04W 8/08; H04W 48/18; H04W 36/30; H04W 12/06
See application file for complete search history.

(56) References Cited

U.S. PATENT DOCUMENTS

2014/0079022 A1* 3/2014 Wang .................... H04W 76/15
370/331
2015/0110041 A1* 4/2015 Ren ........................ H04W 16/14
370/329

(Continued)

FOREIGN PATENT DOCUMENTS

WO    2014148969 A1    9/2014
WO    2015016138 A1    2/2015

OTHER PUBLICATIONS

3GPP, "3rd Generation Partnership Project; Technical Specification Group Core Network and Terminals; Access Network Discovery and Selection Function (ANDSF) Management Object (MO) (Release 12)", 3GPP TS 24.312 V12.8.0, Mar. 2015, 1-375.

(Continued)

*Primary Examiner* — Hassan Kizou
*Assistant Examiner* — Abdullahi Ahmed
(74) *Attorney, Agent, or Firm* — Murphy, Bilak & Homiller, PLLC

(57) ABSTRACT

A method performed by a wireless communications device for measurement reporting. The measurement reporting comprises reporting measurements associated with a first wireless communications network to a network node operating in a second wireless communications network. The first wireless communications network operates according to a first RAT, and the second wireless communications network operates according to a second RAT. The wireless communications device obtains (401), from the network node, an identifier of one or more radio access network nodes operating in the first wireless communications net- (Continued)

work. The obtained identifier restricts a mobility of the wireless communications device in the first wireless communications network to the one or more radio access network nodes identified by the identifier. The wireless communications device excludes (402) from measurement reporting to the network node at least one of the identified radio access network nodes.

14 Claims, 11 Drawing Sheets

(51) Int. Cl.
  *H04W 8/08* (2009.01)
  *H04W 88/06* (2009.01)
  *H04W 12/06* (2021.01)

(56) References Cited

U.S. PATENT DOCUMENTS

| | | | |
|---|---|---|---|
| 2016/0037450 A1* | 2/2016 | Richards | H04W 52/0209 370/311 |
| 2018/0132143 A1* | 5/2018 | Sirotkin | H04W 88/06 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 V13.1.0, Mar. 2016, 1-551.

Unknown, Author, "Network Selection and Data Aggregation with LTE-WLAN Aggregation", 3GPP TSG-RAN2#89BIS meeting, Tdoc R2-151681, MediaTek Inc., Apr. 20-24, 2015, 1-3.

Unknown, Author, "RRM measurements for LTE-WLAN radio aggregation and interworking", 3GPP TSG-RAN WG2 Meeting #90, R2-152108, Nokia Networks, May 25-29, 2015, 1-4.

Unknown, Author, "Traffic steering procedure and command for NCIWK", 3GPP TSG-RAN2 #90 Meeting, R2-152139, MediaTek Inc., May 25-29, 2015, 1-3.

Unknown, Author, "WLAN measurement reporting", 3GPP TSG-RAN2 #90 Meeting, R2-152133, MediaTek Inc., May 25-29, 2015, 1-6.

Unknown, Author, "Control plane protocol architecture for LTE-WLAN integration", 3GPP TSG-RAN WG2 Meeting #90, R2-152103, Nokia Networks, Fukuoka, Japan, May 25-29, 2015, 4 pages.

* cited by examiner

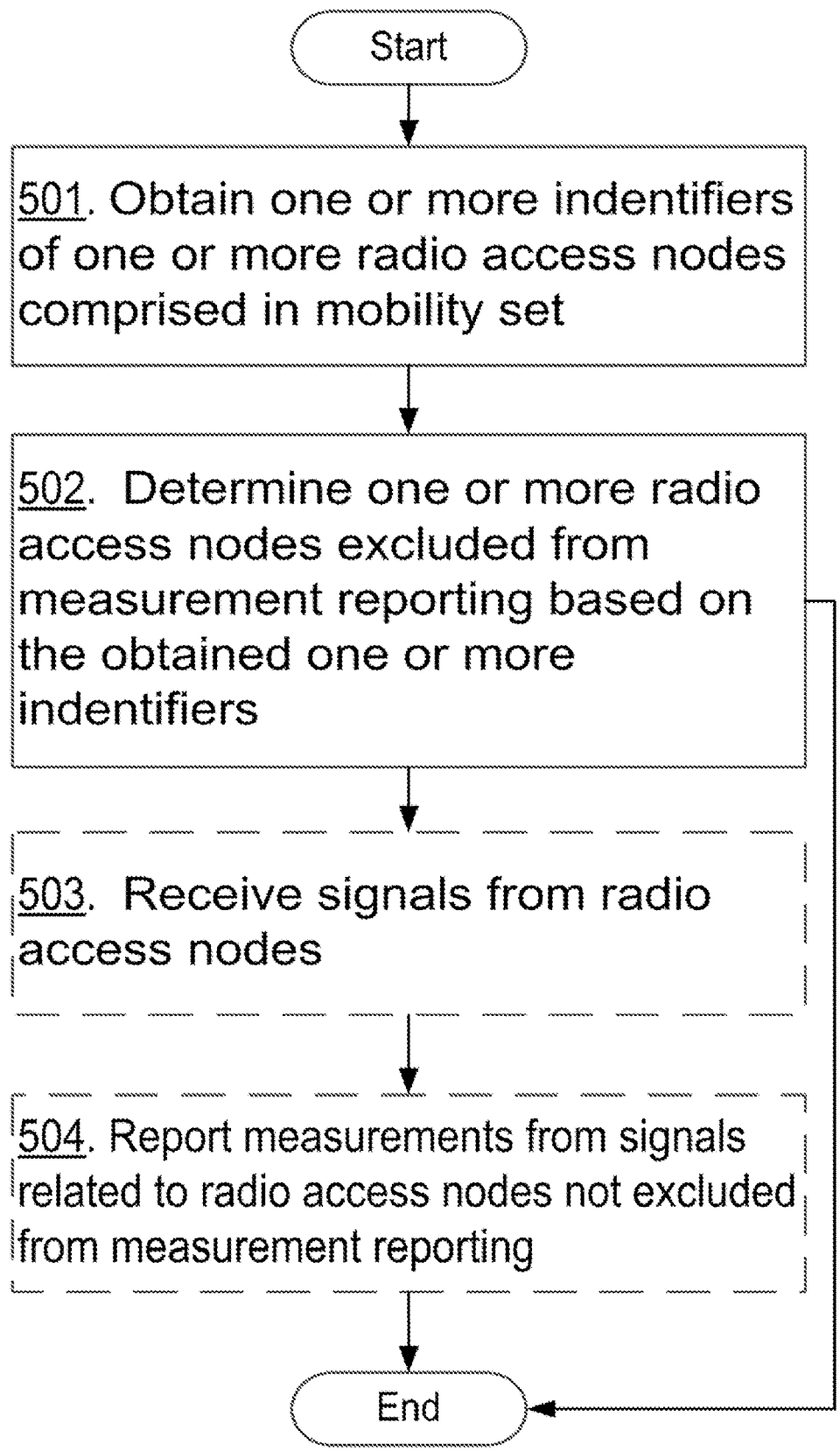
Fig. 5 Method in wireless communications device 250

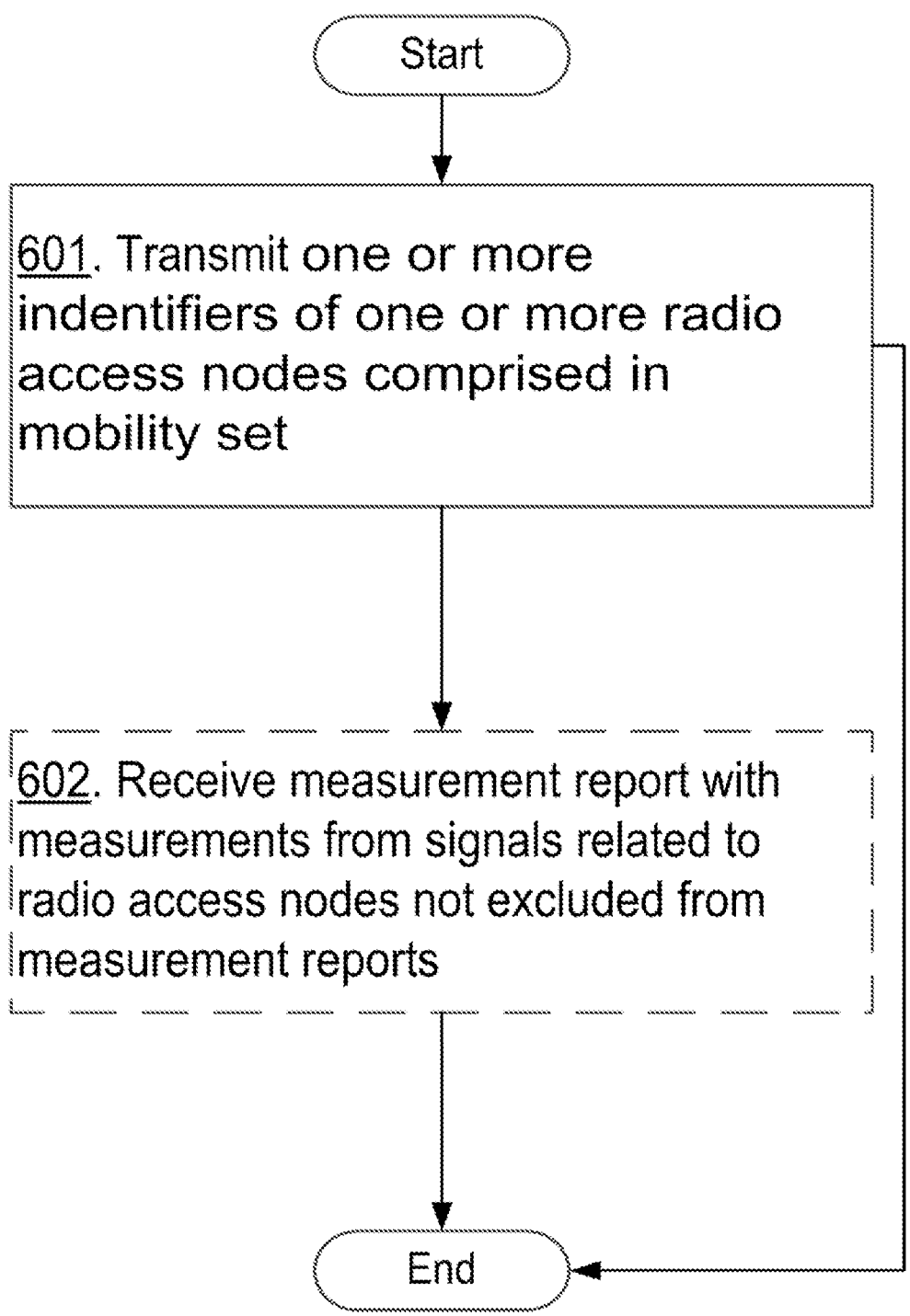
Fig. 6 Method in network node 240

INTER-RAT MEASUREMENT REPORTING

TECHNICAL FIELD

Embodiments herein relate to a wireless communication device, a network node and methods therein for integration of wireless communications networks with different radio access technologies. More specifically embodiments herein relate to measurement reporting between such wireless communications networks.

BACKGROUND

In a typical radio communications network, wireless communication devices, also known as mobile stations and/or User Equipments (UEs), communicate via a Radio Access Network (RAN) to one or more Core Networks (CN). The radio access network covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over the air interface operating on radio frequencies with the user equipments within range of the base stations.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for Evolved Packet System (EPS) have been completed within the 3rd Generation Partnership Project (3GPP) and are further evolved in coming 3GPP releases. The EPS comprises the Evolved Universal Terrestrial Radio Access Network (E-UTRAN), also known as the LTE radio access, and the Evolved Packet Core (EPC), also known as System Architecture Evolution (SAE) core network. E-UTRAN/LTE is a variant of a 3GPP radio access technology wherein radio base station nodes are directly connected to the EPC network, i.e. a radio network controller concept as realized in UMTS with a Radio Network Controller (RNC) does not exist. In general, in EPS the functions of an RNC are distributed between eNBs and the core network. As such, the RAN of an EPS has an essentially "flat" architecture comprising radio base stations without being controlled by RNCs.

A simplified architecture of the LTE system is illustrated as a block diagram in FIG. 1a, including eNBs and evolved packet core nodes. The evolved packet core nodes are illustrated as Mobility Management Entities (MMEs) in FIG. 1a. The eNBs are connected with the MMEs with S1 connections. S1 is an interface between eNBs and MMEs. The MME is used as a control node. For example, the MME is responsible for idle mode UE tracking and paging procedure including retransmissions. The MME is further involved in the bearer activation/deactivation process and is also responsible for choosing a Serving GateWay (SGW) for a UE at the initial attach and at time of intra-LTE handover involving evolved packet core node relocation. The MME is further responsible for authenticating the UE or user of the UE.

In modern cellular networks, the need to provide ever increasing data rates to wireless devices may be met by integrating different Radio Access Technologies (RATs) at the radio level. In particular, 3GPP studies in Release-13 better ways to integrate LTE and Wireless Local-Area Networks (WLANs), in particular for operator-deployed WLANs. By integrating LTE and WLAN, throughput provided by the individual networks may be aggregated by the wireless devices. For this purpose, 3GPP has recently approved a Release-13 work item which among others aims at standardizing LTE-WLAN aggregation.

The WLAN technology known as "Wi-Fi" has been standardized by IEEE in the 802.11 series of specifications, i.e., as "IEEE Standard for Information technology—Telecommunications and information exchange between systems. Local and metropolitan area networks—Specific requirements. Part 11: Wireless LAN Medium Access Control (MAC) and Physical Layer (PHY) Specifications".

The IEEE 802.11 specifications regulate the functions and operations of the Wi-Fi Access Points (APs) and wireless terminals, collectively known as "stations" or "STA," in the IEEE 802.11, including the physical layer protocols, Medium Access Control (MAC) layer protocols, and other aspects needed to secure compatibility and inter-operability between access points and portable terminals.

A WLAN is a network of one or more APs, and may for example be addressed with Service Set Identifiers (SSID)s, Homogeneous Extended Service Set Identifiers (HESSID)s or Basic Service Set Identifiers (BSSID)s.

Wi-Fi is commonly used as wireless extensions to fixed broadband access, e.g., in domestic environments and in so-called hotspots, like airports, train stations and restaurants.

Recently, Wi-Fi has been subject to increased interest from cellular network operators, who are studying the possibility of using Wi-Fi for purposes beyond its conventional role as an extension to fixed broadband access. These operators are responding to the ever-increasing market demands for wireless bandwidth, and are interested in using Wi-Fi technology as an extension of, or alternative to, cellular RATs. Network operators that are currently serving mobile users with, for example, any of the technologies standardized by the 3GPP, including the radio-access technologies known as LTE, UMTS/Wideband Code-Division Multiple Access (WCDMA), and GSM, see Wi-Fi as a wireless technology that may provide good additional support for users in their regular cellular networks.

There is currently quite intense activity in the area of operator-controlled Wi-Fi in several standardisation organisations. In 3GPP, activities to connect Wi-Fi APs to the 3GPP-specified core network are being pursued, and in the Wi-Fi Alliance (WFA), activities related to certification of Wi-Fi products are being undertaken, which to some extent also is driven from the need to make Wi-Fi a viable wireless technology for cellular operators to support high bandwidth offerings in their networks. The term Wi-Fi offload is commonly used and points towards that cellular network operators seek means to offload traffic from their cellular networks to Wi-Fi, e.g. in peak-traffic-hours and in situations when the cellular network for one reason or another needs to be off-loaded, e.g. to provide requested quality of service, maximise bandwidth or simply for coverage.

For a network operator, offering a mix of two technologies that are standardised in isolation from each other, it is a challenge to provide intelligent mechanisms for co-existence.

FIG. 1b, which is a block diagram, illustrates an LTE network and a WLAN network. The networks may be co-located, which means that the WLAN AP and the eNB are implemented in the same node, or non-colocated, meaning that there is an Xw interface between the eNB and the WLAN AP.

LTE-WLAN Aggregation

LTE-WLAN aggregation is a feature wherein a wireless communication device, such as a UE, may receive and transmit radio signals using wireless communication links to both an eNB and a Wireless Termination (WT). The WT is a logical node operating in the WLAN. The WT may be implemented in an AP, Access Controller (AC), or another physical node. The wireless communication device may have a separate data bearer configured on the WLAN side. A data bearer may also be split between an LTE and a WLAN connection. When the bearer is split between the LTE and the WLAN connection, i.e. in the split bearer architecture option of LTE and WLAN aggregation, the downlink data is split on the Packet Data Convergence Protocol (PDCP) layer in the eNB. The eNB may route PDCP Packet Data Units (PDUs) dynamically via eNB Radio Link Control (RLC) protocol to the wireless device directly, or via a backhaul channel to a Secondary eNB (SeNB) or via a WLAN Medium Access Control (MAC) protocol to the wireless device.

In the separate bearer architecture, the lower layers of a bearer are switched to LTE or WLAN. With lower layers of a bearer is meant layers below the PDCP layer. This means that all PDCP packets of that bearer are routed via either the LTE or the WLAN side. From an eNB perspective, the separate bearer architecture, that has been called 2C in dual connectivity, may be seen as a static routing decision.

FIG. 1c, which is a block diagram, shows the protocol architecture option 3C for LTE-WLAN aggregation which resembles the Rel-12 dual connectivity split bearer architecture in LTE, in which the WT assumes the role of the Secondary eNB (SeNB) in LTE. An adaptation layer may be needed in order to adapt PDCP packets to be transported by WLAN. However, depending on implementation the adaptation layer may be at the eNB or WLAN, or parts of it in each node.

In case of the architecture option 2C, there may be either no eNB RLC protocol below the PDCP protocol of the user plane bearer, in case all packets are routed via WLAN to the wireless communication device; or there may be no WLAN, i.e. all packets may be routed via LTE to the wireless communication device.

From an eNB perspective, the network interface between the LTE and the WLAN networks, e.g. an Xw interface as illustrated in FIG. 1c, is always to the WT. However, the wireless device is connected to at most one AP and there may be multiple APs behind one WT.

Further, in legacy WLAN the wireless communication device controls the mobility decisions, while in LTE, the eNB controls the mobility. WLAN mobility may comprise the procedure of changing which WLAN the wireless communication device is connected to and/or served by. In some scenarios of LTE-WLAN Aggregation the eNB provides the wireless communication device with one or more groups of APs, e.g. identified by SSID, HESSID or BSSID, belonging to one or more WLANs. Among these APs, WLAN mobility mechanisms apply and LTE-WLAN aggregation is supported. That is, the wireless communication device may perform mobility among these APs transparent to the eNB. In other words, the wireless communication device is allowed to connect to any of the APs within one or more groups of APs, or groups of WLANs, that are allowed for mobility. However, the eNB does not necessarily know which AP the wireless communication device is connected to. This means that it is "transparent" to the eNB which AP and which WLAN the wireless communication device is connected to.

Mobility of the wireless communication device from the one or more groups of APs, provided by the eNB, and among which WLAN mobility mechanisms apply, to other groups of APs is controlled by the eNB e.g. based on measurement reports provided by the wireless communication device.

In an existing inter-RAT measurement framework the following WLAN related metrics are to be used for WLAN/3GPP Radio interworking:

WLAN Beacon Received Signal Strength Indicator (RSSI)
Channel utilization in (basic service set) BSS load
UL backhaul rate
DL backhaul rate Herein it is assumed that the Rel-13 WLAN measurement framework may also use these metrics. According to current LTE measurement framework the wireless communication device will report the eight best cells, not including the Primary Cell (PCell). Best is in terms of signal strength or signal quality, depending on which metric the wireless communication device is configured to measure. It may further be assumed that the wireless communication device will report a limited number of WLANs and that it will include at least the WLAN beacon RSSI in the report. The eNB configures how the wireless communication device shall make measurement by sending a Radio Resource Control (RRC) reconfiguration message. The RRC reconfiguration message may comprise a Measurement configuration IE.

According to prior art mechanisms the wireless communication device will trigger measurement reports when any WLAN is fulfilling the measurement event triggering conditions which may cause unnecessary and excessive signaling. Another problem is that due to restrictions on measurement reporting the wireless communication device may not report some measurements which may be valuable for the eNB.

SUMMARY

A measurement report transmitted from a wireless communications device, such as a UE, to a network node, such as an eNB, comprises measurement results, such as RSSIs and possible other metrics, only for a fixed number of WLANs. This means that the wireless communications device does not include in the measurement reports some WLANs, e.g. comprising WLAN APs, which it could have been reporting. For example, a wireless communication device is originally configured to measure WLAN APs from an SSID that may comprise tens of WLAN APs. If the wireless communication device includes in the report a specific number of WLANs (e.g. ten best WLANs in terms of RSSI), it may be so that the wireless communication device always includes in the report the same WLANs, e.g. the same WLAN APs. In this case, the network node, e.g. the eNB, does not get reports of any other APs that it may need to discover.

There may also be a case where the RSSI difference between WLANs belonging to different WTs is not very different but the network node may have other reasons related to the interface resources to move a specific wireless communications device from one set to another and for that it may need to determine the beacon signal strength of those WLANs.

An object of embodiments herein is to improve the performance of one or more wireless communications networks. It may be an object of embodiments herein to improve integration of wireless communications networks with different radio access technologies.

In embodiments herein a wireless communications device, such as a UE, determines a set of blacklisted WLANs based on a mobility set. The mobility set is a set of WLANs that comprise the WLANs that the network node, such as an eNB has indicated to the wireless communication device and which the wireless communication device may perform mobility between. Those blacklisted WLANs are then excluded from triggering a measurement report and/or excluded from measurement reports. In embodiments herein the wireless communications device will consider the WLANs in the mobility set to be blacklisted.

According to a first aspect of embodiments herein, the object is achieved by a method performed by the wireless communications device for measurement reporting.

The measurement reporting comprises reporting measurements associated with a first wireless communications network to a network node operating in a second wireless communications network. The first wireless communications network operates according to a first RAT and the second wireless communications network operates according to a second RAT.

The wireless communications device obtains, from the network node, an identifier of one or more radio access network nodes operating in the first wireless communications network. The obtained identifier restricts a mobility of the wireless communications device in the first wireless communications network to the one or more radio access network nodes identified by the identifier.

The wireless communications device excludes from measurement reporting to the network node at least one of the identified radio access network nodes to which the mobility of the wireless communications device in the first wireless communications network is restricted.

According to a second aspect of embodiments herein, the object is achieved by a wireless communications device configured for measurement reporting.

The measurement reporting comprises reporting measurements associated with a first wireless communications network to a network node operating in a second wireless communications network. The first wireless communications network operates according to a first RAT and the second wireless communications network operates according to a second RAT.

The wireless communications device is configured to obtain, from the network node, an identifier of one or more radio access network nodes operating in the first wireless communications network.

The obtained identifier restricts a mobility of the wireless communications device in the first wireless communications network to the one or more radio access network nodes identified by the identifier.

The wireless communications device is further configured to exclude from measurement reporting to the network node at least one of the identified radio access network nodes to which the mobility of the wireless communications device in the first wireless communications network is restricted.

According to a third aspect of embodiments herein, the object is achieved by a computer program product comprising software instructions that, when executed in a processor, performs the method according to the first aspect above.

According to a fourth aspect of embodiments herein, the object is achieved by a wireless communications device for measurement reporting.

The measurement reporting comprises reporting measurements associated with a first wireless communications network to a network node operating in a second wireless communications network. The first wireless communications network operates according to a first RAT and the second wireless communications network operates according to a second RAT.

The wireless communications device comprises a processor and a memory, said memory containing instructions executable by said processor.

Said wireless communication device is operative to obtain, from the network node, an identifier of one or more radio access network nodes operating in the first wireless communications network. The obtained identifier restricts a mobility of the wireless communications device in the first wireless communications network to the one or more radio access network nodes identified by the identifier.

Said wireless communication device is further operative to exclude from measurement reporting to the network node at least one of the identified radio access network nodes to which the mobility of the wireless communications device in the first wireless communications network is restricted.

According to a fifth aspect of embodiments herein, the object is achieved by a wireless communications device for measurement reporting.

The measurement reporting comprises reporting measurements associated with a first wireless communications network to a network node operating in a second wireless communications network. The first wireless communications network operates according to a first RAT and the second wireless communications network operates according to a second RAT.

The wireless communications device comprises an obtaining module configured to obtain from the network node, an identifier of one or more radio access network nodes operating in the first wireless communications network.

The obtained identifier restricts a mobility of the wireless communications device in the first wireless communications network to the one or more radio access network nodes identified by the identifier.

The wireless communications device further comprises a determining module configured to exclude from measurement reporting to the network node at least one of the identified radio access network nodes to which the mobility of the wireless communications device in the first wireless communications network is restricted.

Since the wireless communications device excludes from measurement reporting at least one of the identified radio access network nodes to which the mobility of the wireless communications device in the first wireless communications network is restricted, unnecessary and excessive signalling is avoided.

An advantage of embodiments herein is that unnecessary and excessive signaling is avoided.

Another advantage is that the wireless communications device is enabled to include other radio access network nodes to the measurement report instead of the excluded radio access network nodes.

BRIEF DESCRIPTION OF THE DRAWINGS

Examples of embodiments herein are described in more detail with reference to attached drawings in which:

FIG. 5 is a flowchart depicting embodiments of a method for measurement reporting performed by a wireless communication device.

FIG. 6 is a flowchart depicting embodiments of a method performed by a network node.

DETAILED DESCRIPTION

Figure 1A:
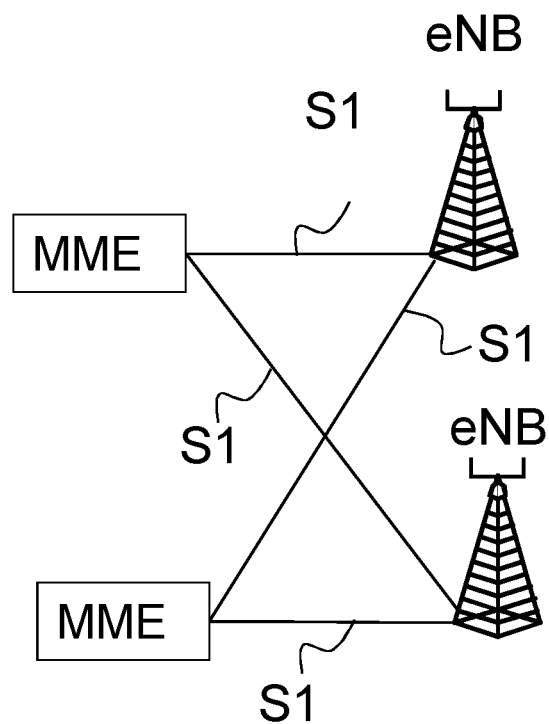
FIG. 1a is a schematic block diagram illustrating a simplified LTE architecture according to prior art.
Figure 1B:
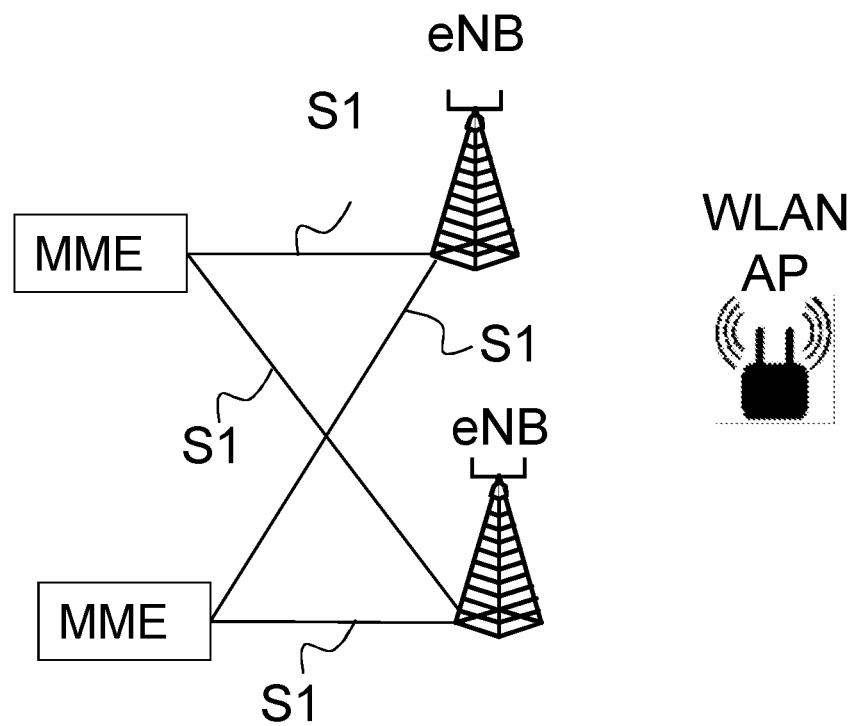
FIG. 1b is a schematic block diagram illustrating LTE and Wi-Fi networks.
Figure 1C:
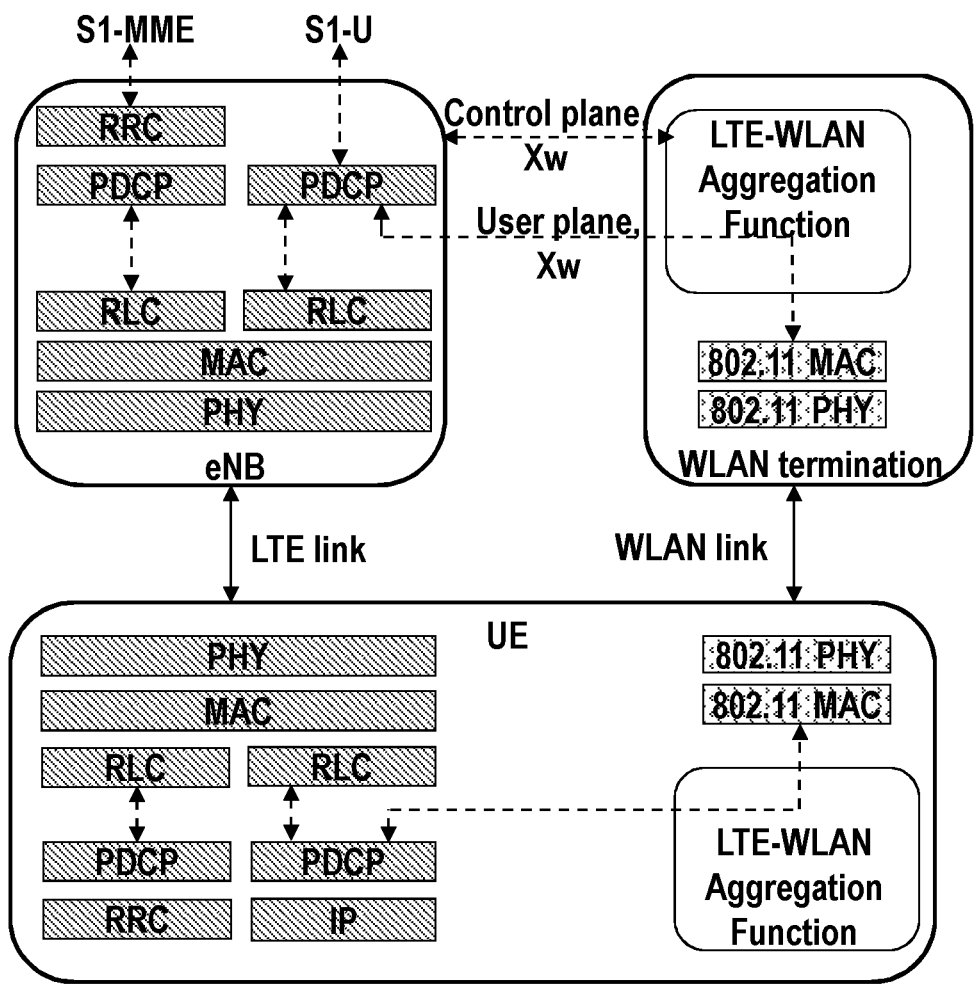
FIG. 1c is a schematic block diagram illustrating protocol architecture option 3C for LTE-WLAN aggregation.
Figure 2:
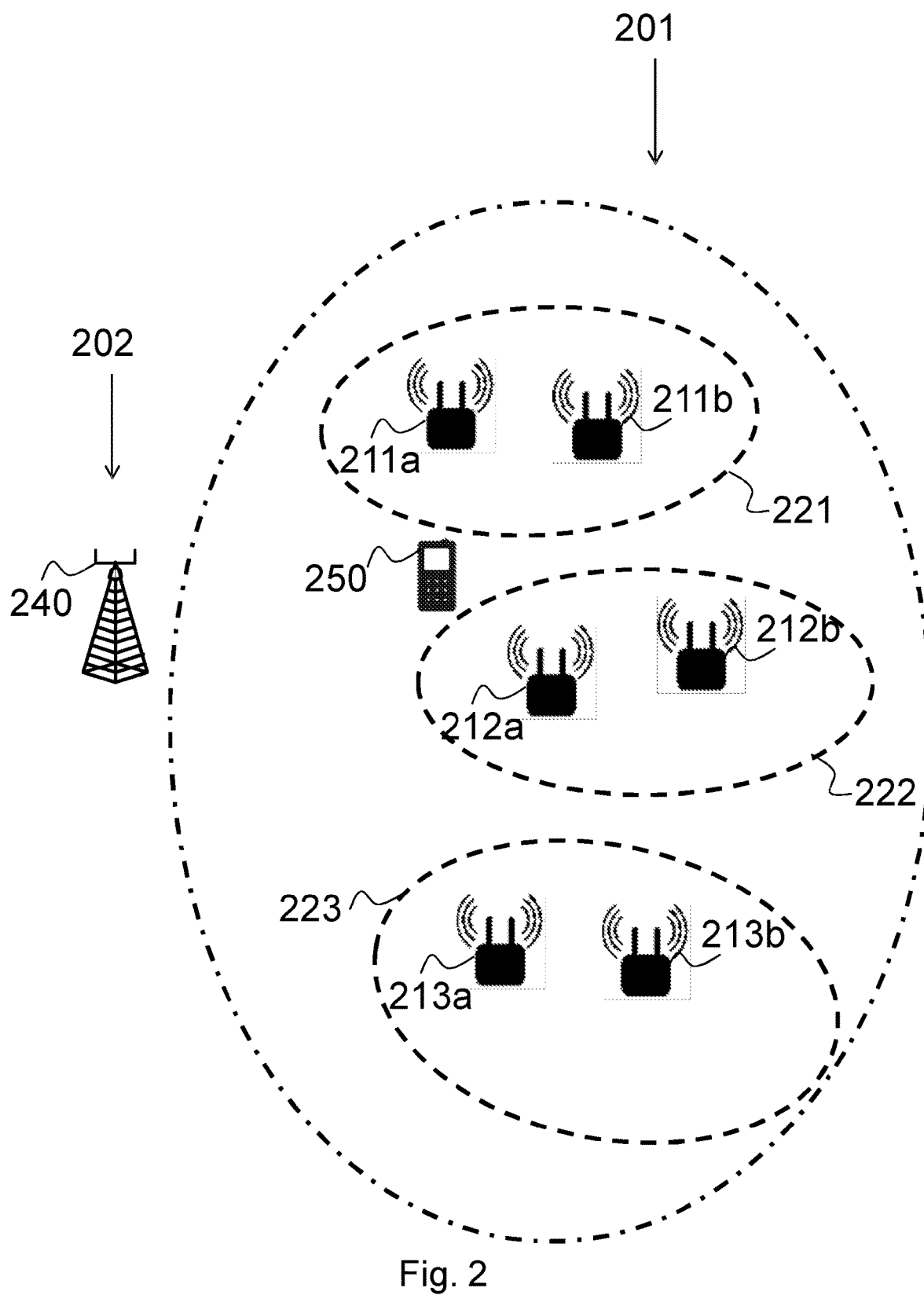
FIG. 2 is a schematic block diagram illustrating a first wireless communication network and a second wireless communication network in which wireless communication networks embodiments herein may be implemented.

Embodiments herein may be implemented in one or more wireless communications networks whereof FIG. 2 depicts parts of a first wireless communications network 201 also known as radio communications network, a telecommunications network or similar. The first wireless communication network 201 may comprise one or more RAN and one or more CN.

The first wireless communication network 201 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations.

More specifically, the first wireless communications network 201 may operate according to a first RAT.

The first wireless communication network 201 is exemplified herein as a WLAN, such as a Wi-Fi network.

FIG. 2 further depicts parts of a second wireless communications network 202 also known as radio communications network, a telecommunications network or similar. The second wireless communication network 202 may comprise one or more RAN and one or more CN. The second wireless communication network 202 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Wi-Fi, Worldwide Interoperability for Microwave Access (WiMax), or Ultra Mobile Broadband (UMB), just to mention a few possible implementations.

More specifically, the second wireless communications network 202 may operate according to a second RAT, which is different from the first RAT mentioned above.

The second wireless communication network 202 is exemplified herein as an LTE network.

In the first wireless communications network 201, radio access network nodes capable of communicating with wireless communications devices operate. For example, one or more first radio access network nodes 211a, 211b capable of radio communication with wireless communications devices operates in the first wireless communications network 201. The one or more first radio access network nodes 211a, 211b are configured to operate in the first wireless communications network 201. The one or more first radio access network nodes 211a, 211b may also be referred to as radio base stations and e.g. eNBs, eNode Bs, base transceiver stations, Access Point Base Stations, base station routers, or any other network units capable of radio communication with wireless communications devices.

Further, there may be further radio access network nodes operating in the first wireless communications network 201. For example, there may be one or more second radio access network nodes 212a, 212b and one or more third radio access network nodes 213a, 213b as illustrated in FIG. 2.

The one or more radio access network nodes 211a, 211b, 212a, 212b, 213a, 213b are exemplified as WLAN APs in embodiments herein.

As mentioned above, a WLAN is a network of one or more APs, and may be addressed with Service Set Identifiers (SSID)s, Homogeneous Extended Service Set Identifiers (HESSID)s or Basic Service Set Identifiers (BSSID)s.

In embodiments herein, the one or more first radio access network nodes 211a, 211b may be referred to as a first radio access network 221. This first radio access network 221 may e.g. be a first WLAN. Further, the one or more second radio access network nodes 212a, 212b may be referred to as a second radio access network 222. Yet further, the one or more third radio access network nodes 213a, 213b may be referred to as a third radio access network 222. The second radio access network 222 and the third radio access network 223 may also be WLANs.

In the second wireless communications network 202, network nodes capable of communicating with wireless communications devices operate. For example, a network node 240 capable of communicating with wireless communications devices operates in the second wireless communications network 202. The network node 240 is configured to operate in the second wireless communications network 202. In some embodiments the network node 240 is a network node capable of radio communication, i.e. a radio network node or a radio access network node such as a base station. The network node 240 may also be referred to as a radio base station and e.g. an eNB, eNode B, a base transceiver station, Access Point Base Station, base station router, or any other network unit capable of communicating with wireless communications devices.

In some other embodiments the network node 240 is a network node that communicates with the wireless communications devices via a radio network node. In this case the network node 240 may for example be a Radio Network Controller (RNC) in an UMTS network. The RNC is not shown in FIG. 2.

A wireless communications device 250, also known as a mobile station, wireless device, a user equipment and/or a wireless terminal, is capable of communicating with the first wireless communications network 201. Further, the wireless communications device 250 is also capable of communicating with the second wireless communications network 202. For example, the wireless communications device 250 is capable of communicating control signals and/or user plane data with the second wireless communications network 202 via LTE directly. The wireless communications device 250 may also communicate control signals and/or uplink/downlink user plane data via the first wireless communications network 201, such as a WLAN, to the second wireless communications network 202, such as an LTE network. The first wireless communications network 201 may relay the user plane data to the second wireless communications network 202 via an interface such as an Xw interface. The interface is omitted in FIG. 2.

It should be understood by the skilled in the art that "wireless communications device" is a non-limiting term which means any wireless terminal, user equipment, Machine Type Communication (MTC) device, a Device to Device (D2D) terminal, or node e.g. Personal Digital Assistant (PDA), laptop, mobile, sensor, relay, mobile tablets or even a small base station communicating within respective cell. There may of course be more than one wireless communications device that communicates with the wireless communications networks.

As mentioned above, 3GPP has recently approved a Release-13 work item which among others aims at standardizing LTE-WLAN aggregation based on a protocol architecture similar to the LTE Dual Connectivity in Rel-12.

According to a mechanism which is currently being developed in 3GPP, the wireless communication device 250 may be provided by the network node 240 with a set of WLAN identifiers which may be referred to as a mobility set. In that scenario the wireless communication device 250 is allowed to move freely between WLAN APs which matches these identifiers. That is, the wireless communication device 250 is allowed to connect to any of the APs in the mobility set transparently to the network node 240, i.e. without asking or needing an explicit indication from the network node 240 for permission to do so. In other words, the network node 240 does not control the mobility of the wireless communication device 250 within the mobility set. Instead, the mobility may be based on e.g. UE implementation specific and/or WLAN controlled mobility decision mechanisms. The wireless communication device 250 is not allowed to move to, or in other words connect to, other WLANs which do not match the provided identifiers.

The expression "connected to a WLAN" may include one or many of the following procedures:
  802.11 authentication, i.e. authentication to the WLAN AP, has been completed or is under way;
  802.1x EAP-SIM authentication, i.e. Authentication to the AAA-servers has been completed or is under way;
  Four way hand-shake between the terminal and the WLAN network has been completed;
  An Internet Protocol (IP) address has been assigned to the terminal in WLAN;
  A Packet Data Network (PDN) connection has been established through the WLAN network, i.e., a connection between the terminal and a PDN gateway;
  Data traffic has started through the WLAN network.

According to embodiments herein the network node 240, such as an eNB, may indicate to the wireless communications device 250, such as a UE, which radio access network node, e.g. comprised in or constituting a WLAN, the wireless communications device shall exclude in a measurement reporting feature, i.e. when reporting measurements.

This enables the network node to select which WLANs, e.g. which WLAN APs, the wireless communications device shall report. This makes the WLAN measurements more useful for the network node.

The indication may be the above mentioned mobility set.

Furthermore, some embodiments herein also reduce the number of measurement reports.

Some other embodiments reduce the size of the measurement reports.

Yet some other embodiments reduce both the number of measurement reports and the size of the measurement reports.

This is beneficial from a signalling overhead point of view, as the wireless communications device may not include blacklisted WLANs in the measurement report and hence the number of reported WLANs will be fewer and the report smaller. This may happen in situations when e.g. the wireless communications device detects several blacklisted WLANs and one non-blacklisted WLAN.

As the wireless communications device may exclude WLANs in a measurement reporting procedure the wireless communications device may save power as the wireless communications device does not need to perform measurements for these WLANs. For example, RSSI measurements, and subsequent query/reading of other metrics like load etc. may be excluded, depending on what was included in a measurement configuration, i.e. depending on what the wireless communications device has been asked to find out from the measurements of the WLAN APs it is measuring.

Furthermore, some embodiments provide a very signalling effective way for the network node 240 to indicate those WLANs which the wireless communication device 250 shall exclude.

Some embodiments herein describe how a wireless network node operating according to a second RAT, such as an eNB in an LTE network, provides a wireless communications device with a set of identities of radio access network nodes operating according to a first RAT, such as identities of APs in one or more WLANs. The wireless communications device excludes nodes matching one or more of the provided identifiers when evaluating a measurement event and/or excludes nodes matching one or more of the provided identifiers when compiling a measurement report. The set of identifiers may be referred to as a blacklist.

Even though it will be used as an example that an LTE eNB is providing the blacklist for WLANs to the wireless communication device 250, it may be possible to apply the embodiments described herein to other combinations of RATs. Such combinations may be combinations of: LTE, UMTS, WLAN, WiMAX, GSM, etc.

Embodiments herein present a method which is implemented in the wireless communications device 250 and the network node 240. An eNB is used as an example of the network node in the following, but generally it may be another network node serving the wireless communications device 250 as well, for example for UMTS the applicable network node may also be the RNC. The wireless communications device 250 will be exemplified with a UE.

Figure 3:
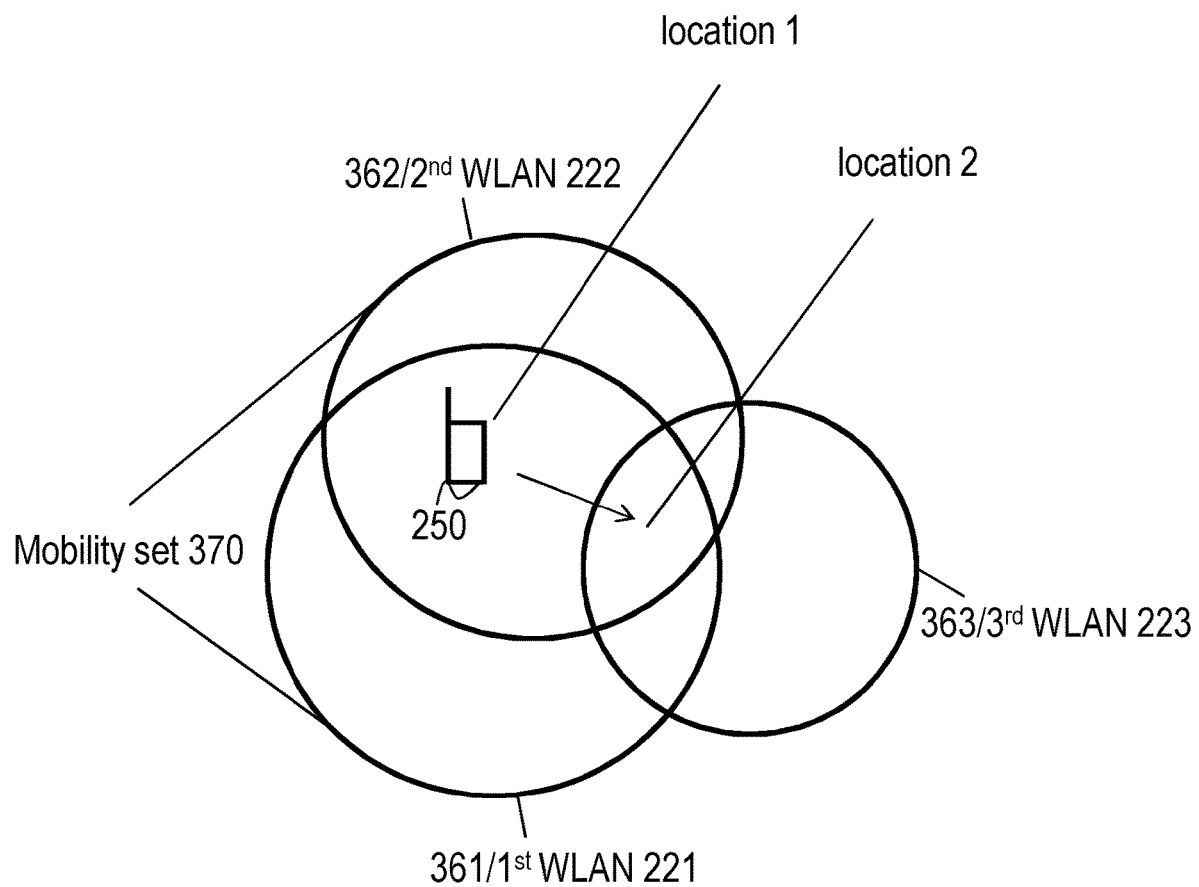
FIG. 3 is a schematic block diagram illustrating a first wireless communication network within which a wireless communications device is moving.

FIG. 3, which is a block diagram, illustrates coverage areas of the radio access networks. A coverage area is a geographical area where radio coverage is provided by the radio access network node. The first radio access network 221 provides radio coverage in a first coverage area 361. The second radio access network 222 provides radio coverage in a second coverage area 362. The third radio access network 223 provides radio coverage in a third coverage area 363.

FIG. 3 further illustrates a scenario in which embodiments herein may be implemented. In this scenario the wireless communications device 250 is initially located at a first location 1 in the first coverage area 361 and in the second coverage area 362.

The wireless communications device 250 is further initially configured with the first radio access network 221 and the second radio access network 222 in its mobility set. In other words, the first radio access network 221 and the second radio access network 222 are initially comprised in the mobility set of the wireless communications device 250.

That means that the mobility of the wireless communications device 250 among the first radio access network 221 and the second radio access network 222 is governed by the mobility mechanisms for the first wireless communications network 201. Use of the first wireless communications network 201 is supported while the wireless communications device 250 is connected to either the first radio access network 221 or the second radio access network 222. To use the first wireless communications network 201 means that the wireless communications device 250 may receive and transmit radio signals using wireless communication links in the first wireless communications network 201.

Then the wireless communications device 250 moves to another second location 2 where it is also in the third coverage area 363 of the third radio access network 223.

To enable addition of the third radio access network 223 to the mobility set then the network node 240 would like the wireless communications device 250 to report measurements for WLANs and for example configure the wireless communications device 250 with a reporting event which will trigger when a radio access network becomes better than a configured threshold.

It may however be wanted that the wireless communications device 250 does not consider the first radio access network 221 or the second radio access network 222 when evaluating this event. A reason for this is that the first radio access network 221 and the second radio access network 222 are already in the mobility set and those WLANs would trigger the measurement report unnecessarily. Instead it may be wanted that the wireless communications device 250 only considers WLANs which are not in the mobility set when evaluating the events, i.e. the third radio access network 223 in this example.

Actions for measurement reporting and for excluding one or more radio access network nodes such as the radio access network nodes in the first and second radio access networks 221, 222, from measurement reporting in the first wireless communications system 201 according to embodiments herein will now be described in relation to FIG. 4a, FIG. 4b, FIG. 5 and FIG. 6 and with continued reference to FIG. 2.

The measurement reporting comprises reporting measurements associated with the first wireless communications network 201 to the network node 240 operating in the second wireless communications network 202. In other words, the measurement reporting comprises reporting measurements associated with one or more of the radio access network nodes 211a, 211b, 212a, 212b, 213a, 213b operating in the first wireless communications network 201.

Figure 4A:
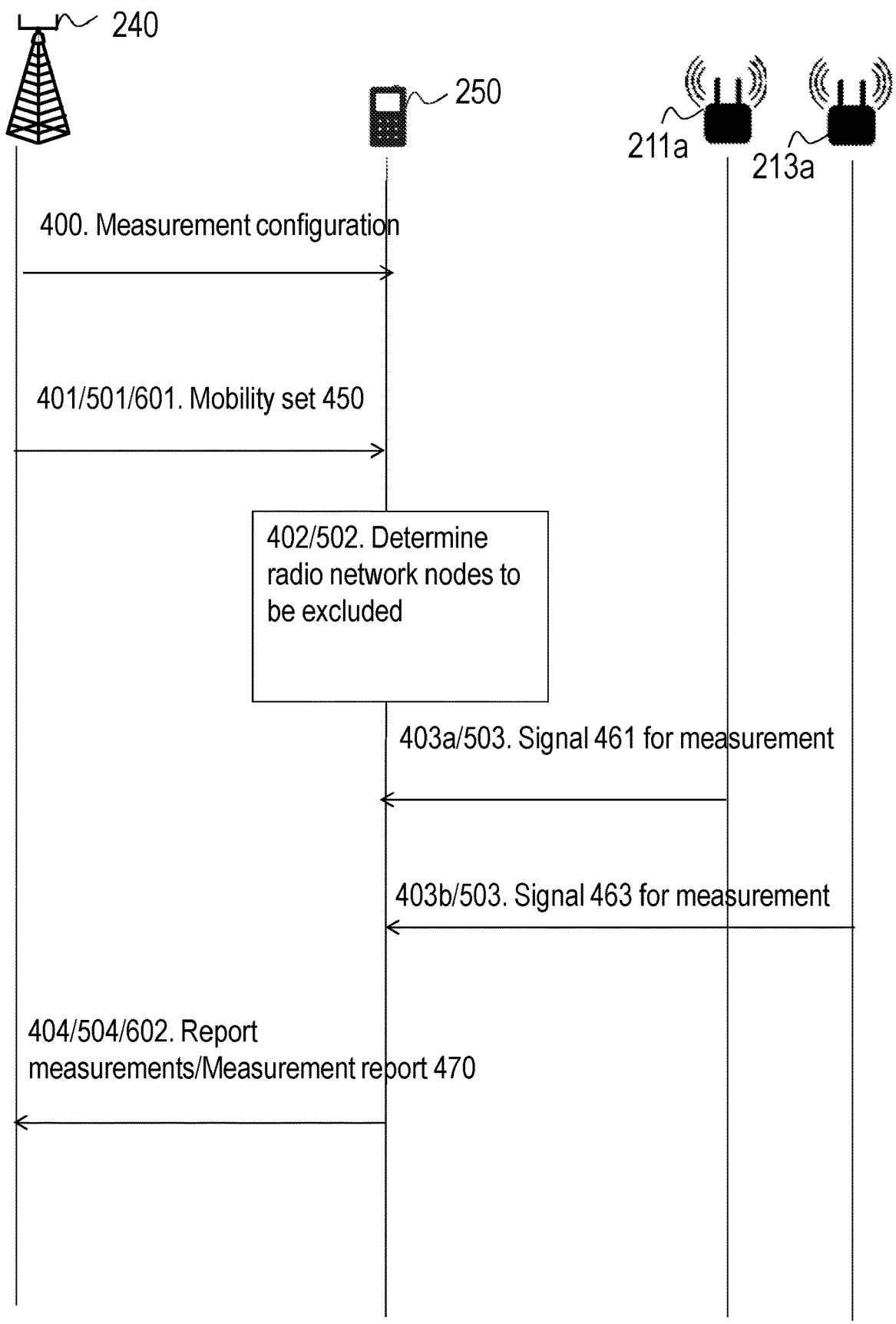
FIG. 4a is a combined signalling diagram and flow chart illustrating embodiments of a method for measurement reporting.
Figure 4B:
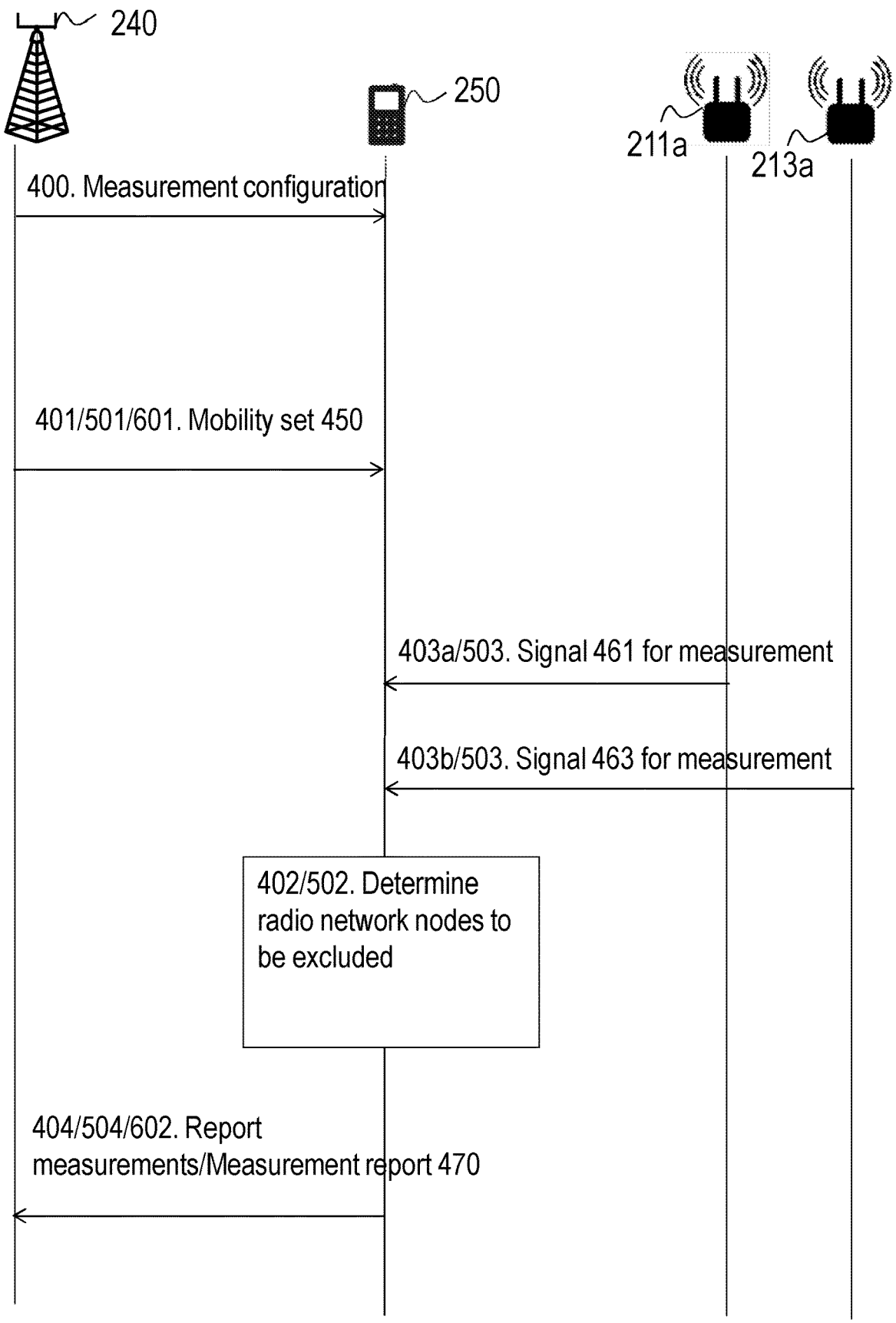
FIG. 4b is a further combined signalling diagram and flow chart illustrating embodiments of a method for measurement reporting.

FIGS. 4a and 4b are each a combined signalling diagram and flow chart that describes a method for excluding the one or more radio access network nodes 211a, 211b, 212a, 212b from measurement reporting according to embodiments herein.

FIG. 5 is a flowchart that describes a method performed by the wireless communications device 250 for excluding the one or more radio access network nodes 211a, 211b, 212a, 212b from measurement reporting according to embodiments herein.

FIG. 6 is a flowchart that describes a method performed by the network node 240 for excluding the one or more radio access network nodes 211a, 211b, 212a, 212b from measurement reporting according to embodiments herein.

It should be noted that the following embodiments are not mutually exclusive. Components from one embodiment may be tacitly assumed to be present in another embodiment and it will be obvious to a person skilled in the art how those components may be used in the other exemplary embodiments.

As mentioned above, the first wireless communications network 201 operates according to the first RAT, and the second wireless communications network 202 operates according to the second RAT. For example, the first wireless communications network 201 may be a WLAN and the second wireless communications network 202 may be a 3GPP network, such as any of an LTE network and a UMTS network.

Action 400

As mentioned before the wireless communications device 250 may be configured by the network node 240 to measure signals from the radio access network nodes 211a, 211b, 212a, 212b, 213a, 213b operating in the first wireless communications network 201. The wireless communications device 250 may further be configured by the network node 240 to report some or all of these measurements to the network node 240. The network node 240 and/or some other network node in the second wireless communications network may for example use these measurements for WLAN/3GPP radio interworking. For example, the network node 240 may use these measurements to control the mobility of the wireless communications device 250 across one or more groups of radio access network nodes in the first wireless communications network 201, such as the first radio access network 221, the second radio access network 222 and the third radio access network 223.

The network node 240 may configure the wireless communications device 250 to measure signals from the radio access network nodes 211a, 211b, 212a, 212b, 213a, 213b by transmitting identifiers associated with the one or more radio access network nodes 211a, 211b, 212a, 212b, 213a, 213b. For example, network node 240 may transmit an SSID that is associated with a plurality of the radio access network nodes 211a, 211b, 212a, 212b, 213a, 213b. The SSID may for example be associated with tens of APs.

If the wireless communications device 250 includes in the measurement report a specific number of radio access network nodes, e.g. the ten best radio access network nodes in terms of RSSI, it may be so that the wireless communications device 250 always includes in the report the same radio access network nodes.

Taking the example of FIG. 2, the four best radio access network nodes in terms of RSSI may be the first and second radio access network nodes 211a, 211b, 212a, 212b. Further, in this example the report is limited to four radio access network nodes, e.g. four WLANs. Then it may be so that the wireless communications device 250 always includes in the report the first and second radio access network nodes 211a, 211b, 212a, 212b. In this case, the network node 240 does not get reports of any other radio access network nodes, such as the third radio access network nodes 213a, 213b that it may need to discover, which may be a problem.

As mentioned before, for the existing LTE-WLAN inter-RAT measurement framework the following WLAN related metrics are to be used for WLAN/3GPP Radio interworking:
WLAN Beacon Received Signal Strength Indicator (RSSI)
Channel utilization in (basic service set) BSS load
UL backhaul rate
DL backhaul rate Herein it is assumed that the Rel-13 WLAN measurement framework may also use these metrics. According to current LTE measurement framework the UE will report the eight best cells, not including the Primary Cell (PCell). Best is in terms of signal strength or signal quality, depending on which metric the UE is configured to measure.

Therefore it may further be assumed that the wireless communications device 250 will report a limited number of radio access network nodes 211a, 211b, 212a, 212b. It may further be assumed that for an embodiment in LTE-WLAN the wireless communications device 250 will include at least the WLAN beacon RSSI in the report.

Action 401

In order to restrict the mobility of the wireless communications device 250 in the first radio access network 221 the network node 240 transmits one or more identifiers, such as an identifier 450, of radio access network nodes 211a, 211b, 212a, 212b operating in the first wireless communications network 201.

The one or more identifiers 450 of radio access network nodes 211a, 211b, 212a, 212b may each be an identifier of one or more radio access network nodes 211a, 211b, 212a, 212b.

As mentioned above, the wireless communication device 250 may perform mobility between the identified one or more radio access network nodes 211a, 211b, 212a, 212b. That is, mobility is allowed to and from the one or more radio access network nodes 211a, 211b, 212a, 212b identified by the one or more identifiers.

In this way the wireless communications device 250 obtains the one or more identifiers 450 of the one or more radio access network nodes 211a, 211b, 212a, 212b. As mentioned above in relation to FIG. 3, in a scenario herein the first radio access network 221 and the second radio access network 222 are initially comprised in the mobility set of the wireless communications device 250. Therefore in embodiments herein the wireless communications device 250 may obtain an identifier 450 of the one or more radio access network nodes 211a, 211b, 212a, 212b in the mobility set from the network node 240.

The transmitted one or more identifiers 450 of the one or more radio access network nodes 211a, 211b, 212a, 212b may be indications that one or more out of the one or more radio access network nodes 211a, 211b, 212a, 212b identified by the transmitted identifier 450 are to be excluded from measurement reporting to the network node 240.

Thus in summary, the wireless communications device 250 obtains, from the network node 240, the identifier 450 of one or more radio access network nodes 211a, 211b, 212a, 212b operating in the first wireless communications network 201. The obtained identifier 450 restricts a mobility of the wireless communications device 250 in the first wireless communications network 201 to the one or more radio access network nodes 211a, 211b, 212a, 212b identified by the identifier 450.

In some embodiments the identifier 450 of the one or more radio access network nodes 211a, 211b, 212a, 212b is an identifier of one or more radio access network nodes 211a, 211b, 212a, 212b in a mobility set 370. Mobility is allowed to and from the one or more radio access network nodes 211a, 211b, 212a, 212b in the mobility set 370.

The identifier 450 of the one or more radio access network nodes 211a, 211b, 212a, 212b may be one or more of:
Service Set Identifiers, SSID;
Homogeneous Extended Service Set Identifiers, HESSID;
Basic Service Set Identifiers, BSSID;
Realm; and
Public Land Mobile Network, PLMN.

Further, the identifier 450 of the one or more radio access network nodes 211a, 211b, 212a, 212b may be obtained from the network node 240 through RRC signalling.

In addition to the one or more radio access network nodes 211a, 211b, 212a, 212b identified by the mobility set, the wireless communications device 250 may obtain one or more identifiers of one or more other radio access network nodes that should be excluded from measurement reporting. That is, the wireless communications device 250 may obtain an indication of a further radio access network node 211a, 211b, 212a, 212b, operating in the first wireless communications network 201, to be excluded from measurement reporting to the network node 240. The wireless communications device 250 may obtain this indication already in action 400 above.

In some embodiments the network node 240 is only interested in getting measurements for certain radio access networks but not for other radio access networks, e.g. there may be some WLANs which the wireless communications device 250 may not do WLAN aggregation with etc, or some WLANs which belong to another operator, etc.

Therefore, in one embodiment the network node 240 provides to the wireless communications device 250 a set of identifiers 450, such as WLAN identifiers, which the wireless communications device 250 should consider as blacklisted. This list of identifiers may be independent of the mobility set or whether the wireless communications device 250 is connected to a radio access network, such as a WLAN or not. This may be in the form of a list of WLAN identifiers which may be signaled to the wireless communications device 250 e.g. with RRC signaling. This means that embodiments herein are applicable in a situation where the wireless communications device 250 performs measurements before it is connected to the first wireless communications network 201, such as a WLAN, and/or before an LWA is configured, as well as during interworking between, such as aggregation of, the first and the second wireless communications networks 201, 202, such as during LWA operation.

The wireless communications device 250 may further be provided with WLAN identifiers which should not be included in the measurement reports by other means. For example the wireless communications device 250 may be provided with WLAN identifiers in Access Network Discovery and Selection Function (ANDSF) policies which indicate WLANs which the wireless communications device 250 shall not connect to. ANDSF is an entity within an EPC of the SAE for 3GPP compliant wireless communications networks. The purpose of the ANDSF is to assist wireless communications device 250s to discover non-3GPP access networks, such as Wi-Fi or WiMax and to provide the wireless communications device 250 with rules policing the connection to these networks.

In one embodiment the wireless communications device 250 considers a WLAN as blacklisted if an ANDSF policy has indicated that the wireless communications device 250 shall not connect to the WLAN. ANDSF policies are described in sub-clause 5.8.13 in 3GPP TS 24.312 v 12.8.0.

In one embodiment the wireless communications device 250 may obtain an identity of a PLMN which indicates to the wireless communications device 250 that WLANs which do not match this certain PLMN shall be treated as blacklisted. The PLMN identity is usually specific to an operator. There exists mechanisms to indicate which PLMN a WLAN belongs to, e.g. in the HotSpot 2.0 framework. In one embodiment the wireless communications device 250 considers WLANs which does not match a certain PLMN as blacklisted.

It may also be possible to provide identifiers of the radio access network nodes 211a, 211b, 212a, 212b, such as WLAN identifiers, to the wireless communications device 250 on a SIM-card. Therefore it may be possible to provide to the wireless communications device 250 a set of identifiers, such as WLAN identifiers, which the wireless communications device 250 shall consider connecting to. In one embodiment the wireless communications device 250 considers a WLAN blacklisted if it does not match one or more identifiers on the SIM card of the wireless communication device 250. It may also be possible to explicitly provide a blacklist on the SIM card of the wireless communication device 250. In one embodiment the wireless communications device 250 will consider that blacklist when performing measurements.

Action 402

When the wireless communications device 250 has identified or determined the blacklist the wireless communications device 250 applies it in a WLAN measurement reporting mechanisms.

In some embodiments the wireless communications device 250 determines that one or more out of the one or more radio access network nodes 211a, 211b, 212a, 212b identified by the obtained one or more identifiers 450 are to be excluded from measurement reporting to the network node 240 operating in the second wireless communications network 202.

For example, the wireless communications device 250 may determine that the first radio access network nodes 211a, 211b comprised in the first radio access network 221 shall be excluded from measurement reporting to the network node 240. The determination may be valid for a time period. The time period may be ended by a timer and/or an event that triggers the ending of the time period.

That is, the wireless communications device 250 excludes from measurement reporting to the network node 240 at least one of the identified radio access network nodes 211a, 211b, 212a, 212b to which the mobility of the wireless communications device 250 in the first wireless communications network 201 is restricted.

In some embodiments the excluding from measurement reporting comprises excluding the at least one of the identified radio access network nodes 211a, 211b, 212a, 212b from triggering a measurement report. For example, the excluding from measurement reporting may comprise not triggering a measurement report 470 when the excluded at least one radio access network nodes 211a, 211b, 212a, 212b fulfils a reporting event, i.e. a measurement event. Such a measurement event may be fulfilled e.g. when a WLAN becomes better than a threshold, i.e. when the signal of the WLAN becomes better than a threshold value related to the signal.

In some embodiments the excluding from measurement reporting comprises excluding measurement results for the at least one of the identified radio access network nodes 211a, 211b, 212a, 212b from being included in a measurement report 470 to the network node 240. For example, the wireless communications device 250 may not include measurement results for the excluded one or more radio access network nodes 211a, 211b, 212a, 212b although it should have been included according to a certain reporting criterion. Measurement results may relate to different metrics of signals from the radio access network nodes in the first wireless communications network 201, such as WLAN Beacon Received Signal Strength Indicator (RSSI), Channel utilization in (basic service set) BSS load, UL backhaul rate, and DL backhaul rate. Further, a reporting criterion in LTE-WLAN aggregation may be:

1> if the measured results are for WLAN:

2> set the measResult to include the quantities within the quantityConfig for the following WLAN(s) up to maxReportCells:

3> include WLANs in order of decreasing WLAN RSSI, i.e. the best WLAN is included first, for WLANs which do not match all WLAN identifiers of any entry within wlan-MobilitySet in VarWLAN-MobilityConfig, as described on page 132 of 3GPP TS 36.331 v13.1.0.

In some embodiments the wireless communications device 250 excludes a subset of the identified radio access network nodes 211a, 211b, 212a, 212b. With subset is meant a proper subset.

In one embodiment the wireless communications device 250 triggers a measurement report only if non-blacklisted WLANs fulfills a reporting event. But a blacklisted WLAN may not trigger a report even if the triggering conditions is fulfilled for that WLAN. This has the benefit that unnecessary measurement reports are not sent and hence the amount of signaling overhead may be reduced.

In one embodiment the wireless communications device 250 will not include blacklisted WLANs in measurement reports. This reduces the size of the measurement report and hence the amount of signaling is reduced. Another advantage may be that the wireless communications device 250 may include other WLANs to the measurement report instead of the blacklisted WLANs.

Whether the wireless communications device 250 shall exclude blacklisted WLANs when determining whether to trigger the report and/or exclude blacklisted WLANs when compiling the measurement report may be specified in a specification or configured by the network.

As mentioned above, in embodiments herein, the wireless communications device 250 determines which radio access network nodes to exclude from some or all measurement reporting procedures based on the one or more identifiers 450 of a mobility set 370 or sets, e.g. the mobility set 370.

In addition to this the wireless communications device 250 may further base its determining on further grounds, which will now be explained below. Thus, the wireless communications device 250 may further exclude a further radio access network node 211a, 211b, 212a, 212b from measurement reporting to the network node 240 based on the received indication of the further radio access network node 211a, 211b, 212a, 212b to be excluded from measurement reporting to the network node 240. This indication was descried above in action 401. There it was also described that one possibility to receive the further indication is to receive it in action 400, when the wireless communications device 250 is configured for measurements.

For example there may be further radio access network nodes not part of the mobility set that may be excluded in addition. Also in some embodiments only a subset of the radio access network nodes 211a, 211b, 212a, 212b comprised in the mobility set will be excluded from measurement reporting.

In some scenarios it may be wanted that the wireless communications device 250, such as a UE, only considers radio access networks, such as WLANs, which the wireless communications device 250 is not connected to. This may be implemented as the wireless communications device 250 may blacklist the radio access network which the wireless communications device 250 is connected to. The benefit of identifying the blacklisted as the radio access network which the wireless communications device 250 is connected to is that in this way the network node 240, such as an eNB, knows that all reported radio access networks are radio access networks the wireless communications device 250 is not connected to currently. It should be noted that within the mobility set, the network node 240 is not aware to which radio access network the wireless communications device 250 is connected to at a given time.

In some embodiments, the wireless communications device 250 may know the PLMN identity of the 3GPP network the wireless communications device 250 is connected to. As mentioned above in action 401, in one embodiment the wireless communications device 250 considers WLANs which does not match a certain PLMN as blacklisted.

For example, the wireless communications device 250 may determine the PLMN of the serving 3GPP network, and the wireless communications device 250 may then consider WLANs which do not belong to this PLMN to be blacklisted.

Thus by excluding the one or more radio access network nodes 211a, 211b, 212a, 212b identified by the identifier 450, e.g. the APs in the mobility set, the amount of signaling overhead within the second wireless communication network 202 may be reduced. The signaling overhead may be reduced by a reduced size of the measurement reports and/or by a reduced number of measurement reports.

Another advantage may be that the wireless communications device 250 may include other radio access network nodes, operating in the first wireless communications network 201, in the measurement report instead of the blacklisted radio access network nodes 211a, 211b, 212a, 212b.

Actions 403a, 403b

As mentioned before, measurements of signals from the radio access network nodes 211a, 211b, 212a, 212b, 213a, 213b operating in the first wireless communications network 201 may be used to control the mobility of the wireless communications device 250.

Therefore the wireless communications device 250 may receive one or more signals 461, 463 from a plurality of radio access network nodes 211a, 211b, 212a, 212b, 213a, 213b operating in the first wireless communications network 201.

For example, as illustrated in FIG. 4b the wireless communications device 250 may receive a first signal 461 from the first radio access network node 211a and a second signal 463 from the third radio access network node 213a.

Action 404

In order for the network node 240 to use the measurements of the signals 461, 463 received above in actions 403a, 403b, 503 the wireless communications device 250 may report the measurements to the network node 240. The reported measurements are related to the received one or more signals 461, 463.

The reporting of the measurements is based on the determination that the at least one radio access network node 211a, 211b, 212a, 212b identified by the obtained identifier 450 is to be excluded from measurement reporting to the network node 240.

Thus in some embodiments, the wireless communications device 250 reports metrics and/or measurements related to the received signals 461, 463 to the network node 240. The reporting of the measurements is based on the excluding in action 402, 502 above.

The actions of FIG. 5 will now be shortly described.

Action 501

The wireless communications device 250 obtains, from the network node 240, the identifier 450 of one or more radio access network nodes 211a, 211b, 212a, 212b operating in the first wireless communications network 201. The obtained identifier 450 restricts a mobility of the wireless communications device 250 in the first wireless communications network 201 to the one or more radio access network nodes 211a, 211b, 212a, 212b identified by the identifier 450.

This action is related to action 401 above and action 601 below.

Action 502

The wireless communications device 250 excludes from measurement reporting to the network node 240 at least one of the identified radio access network nodes 211a, 211b, 212a, 212b to which the mobility of the wireless communications device 250 in the first wireless communications network 201 is restricted.

This action is related to action 402 above.

Action 503

The wireless communications device 250 may receive one or more signals 461, 463 from the plurality of radio access network nodes 211a, 211b, 212a, 212b, 213a, 213b operating in the first wireless communications network 201.

This action is related to action 403 above.

Action 504

In some embodiments, the wireless communications device 250 reports metrics and/or measurements related to the received signals 461, 463 to the network node 240. The reporting of the measurements is based on the excluding in action 502 above.

This action is related to action 404 above and action 602 below.

The actions of FIG. 6 will now be shortly described.

Action 601

The network node 240 transmits, to the wireless communications device 250, the one or more identifiers, such as the identifier 450, of radio access network nodes 211a, 211b, 212a, 212b operating in the first wireless communications network 201.

This action is related to actions 401 and 501 above.

Action 602

The network node 240 receives a measurement report 470 related to the one or more signals 461, 463 received by the wireless communications device 250. The signals are related to the one or more radio access network nodes in the first wireless communications network 201. The measurement report 470 does not comprise measurements related to at least one of the radio access network nodes 211a, 211b, 212a, 212b, identified by the identifier 450 transmitted in action 401, 501, 601.

This action is related to actions 404 and 504 above

It has above been described different methods according to which the blacklist may be defined. There are different possible ways of selecting which—one or many—of these methods that shall be applied. The possible ways of selecting comprise e.g.:
- selected by the wireless communications device 250 based on implementation specific criteria, i.e. criteria specific for the actual wireless communications device. This may comprise selecting the WLAN which the wireless communications device 250 estimates will give the best performance. This may be estimated based on several metrics such as signal strength/quality, load, etc.;
- selected based on specified rules, e.g. in a specification;
- selected based on network indications, e.g. the network node 240 may provide an indication to the wireless communications device 250.

The above indications may be signaled with RRC, for example in a measurement object for WLAN, e.g. MeasObjectWLAN.

The blacklist may be defined as those WLANs which belong to the mobility set 370. Where the mobility set 370 is a set of network nodes identified e.g. by a set of WLAN identifiers, such as SSIDs, BSSIDs, HESSIDs, Realm, PLMN, which the wireless communications device 250 may perform mobility between. The mobility may be based on wireless communications device 250 implementation specific and/or WLAN controlled mobility decision mechanisms.

The expression "serving" used herein may mean that a network node or a WLAN is currently serving the wireless communications device 250. It may also refer to a WLAN which is planned to soon serve the wireless communications device 250, e.g. the WLAN which the wireless communications device 250 is connected to. This allows the wireless communications device 250 to exclude a WLAN which is intended to serve the wireless communications device 250, e.g. due to that the wireless communications device 250 has been handed over to the other WLAN.

As explained above the blacklist may be a set of WLANs and those may be defined by a set of WLAN identifiers. These WLAN identifiers may be of diffident types including: SSIDs, BSSIDs, HESSIDs, Realm, PLMN. A WLAN may be part of and/or connected to one or more Realms. A realm is a domain which the wireless communications device 250 may authenticate to. For example, a first operator operating WLANs located in airports may have an agreement with a second operator such that the customers of the second operator, and thus their wireless communications devices, may connect to the first operator's WLANs. Then the first operator's WLANs will be connected to both the first operator's realm and the second operator's realm.

It should be noted that WLANs in general have several identifiers associated with them. For example a WLAN AP may have a BSSID, an SSID a HESSID, etc. A WLAN may be considered to be a blacklisted WLAN if it matches one or more of the blacklisted WLAN identifiers. E.g. in some embodiments if the blacklist is {SSID=X, BSSID=A, BSSID=B} then:
- A WLAN with SSID=Y and BSSID=A is blacklisted.
- A WLAN with SSID=X and BSSID=C is blacklisted.
- A WLAN with SSID=X and BSSID=B is blacklisted
- A WLAN with SSID=Y and BSSID=C is not blacklisted.

The method for measurement reporting may be performed by the wireless communications device 250. The wireless communications device 250 may comprise the modules depicted in FIG. 7 for excluding one or more radio access network nodes, such as the radio access network nodes 211a, 211b, 212a, 212b in the first and second radio access networks 221, 222, from measurement reporting.

To do so the wireless communications device 250 is configured for measurement reporting. As mentioned above, in the context of embodiments herein the measurement reporting comprises reporting measurements associated with the first wireless communications network 201 to the network node 240 operating in the second wireless communications network 202.

As further mentioned above, the first wireless communications network 201 operates according to the first RAT, and the second wireless communications network 202 operates according to the second RAT.

The wireless communication device 250 is configured to, e.g. by means of an obtaining module 710 configured to, obtain, from the network node 240, the identifier 450 of the one or more radio access network nodes 211a, 211b, 212a, 212b operating in the first wireless communications network 201. The obtained identifier 450 restricts the mobility of the wireless communications device 250 in the first wireless communications network 201 to the one or more radio access network nodes 211a, 211b, 212a, 212b identified by the identifier 450.

The obtaining module 710 may be implemented, at least in part, by a processor 780 in the wireless communication device 250. Thus action 501 may be performed by means such as the obtaining module 710 in the wireless communications device 250.

The wireless communication device 250 is further configured to, e.g. by means of the determining module 720 configured to, exclude from measurement reporting to the network node 240 at least one of the identified radio access network nodes 211a, 211b, 212a, 212b to which the mobility of the wireless communications device 250 in the first wireless communications network 201 is restricted. For example, the determining module 720 may determine to exclude at least one of the identified radio access network nodes 211a, 211b, 212a, 212b.

In some embodiments the wireless communications device 250 is configured to exclude the at least one of the identified radio access network nodes 211a, 211b, 212a, 212b from triggering the measurement report.

In some embodiments the wireless communications device 250 is configured to exclude measurement results for the at least one of the identified radio access network nodes 211a, 211b, 212a, 212b from being included in the measurement report 470 to the network node 240.

The wireless communications device 250 may be configured to exclude a subset of the identified radio access network nodes 211a, 211b, 212a, 212b.

The determining module 720 may be implemented, at least in part, by the processor 780 in the wireless communication device 250. Thus action 502 may be performed by means such as the determining module 720 in the wireless communications device 250.

The wireless communication device 250 may be further configured to, e.g. by means of the receiving module 730 configured to, receive signals 461, 463 from the plurality of radio access network nodes 211a, 211b, 212a, 212b, 213a, 213b operating in the first wireless communications network 201.

The receiving module 730 may be implemented, at least in part, by the processor 780 in the wireless communication device 250. Thus action 503 may be performed by means such as the receiving module 730 in the wireless communications device 250.

In some embodiments, when the wireless communication device 250 has received the signals 461, 463 from the plurality of radio access network nodes 211a, 211b, 212a, 212b, 213a, 213b, the wireless communication device 250 is further configured to, e.g. by means of a reporting module 740 configured to, report metrics and/or measurements related to the received signals 461, 463 to the network node 240. The wireless communications device 250 is configured to report the measurements based on the exclusion of the at least one of the identified radio access network nodes 211a, 211b, 212a, 212b to which the mobility of the wireless communications device 250 in the first wireless communications network 201 is restricted.

The reporting module 740 may be implemented, at least in part, by the processor 780 in the wireless communication device 250. Thus action 504 may be performed by means such as the reporting module 740 in the wireless communications device 250.

In some embodiments the wireless communication device 250 is further configured to, e.g. by means of the obtaining module 710 configured to, obtain the indication of a further radio access network node 211a, 211b, 212a, 212b operating in the first wireless communications network 201 to be excluded from measurement reporting to the network node 240.

When the wireless communication device 250 has obtained the indication of a further radio access network node 211a, 211b, 212a, 212b to be excluded, the wireless communication device 250 may be further configured to, e.g. by means of the determining module 720 configured to, exclude the further radio access network node 211a, 211b, 212a, 212b from measurement reporting to the network node 240 based on the indication.

The network node 240 may comprise the modules mentioned above and depicted in FIG. 8 for assisting the wireless communication device 250 in excluding one or more radio access network nodes, such as the radio access network nodes 211a, 211b, 212a, 212b in the first and second radio access networks 221, 222, from measurement reporting.

Action 601 may be performed by means such as a transmitting module 810 in the network node 240. The transmitting module 810 may be implemented by a processor 880 in the network node 240.

Action 602 may be performed by means such as a receiving module 820 in the network node 240.

Figure 7:
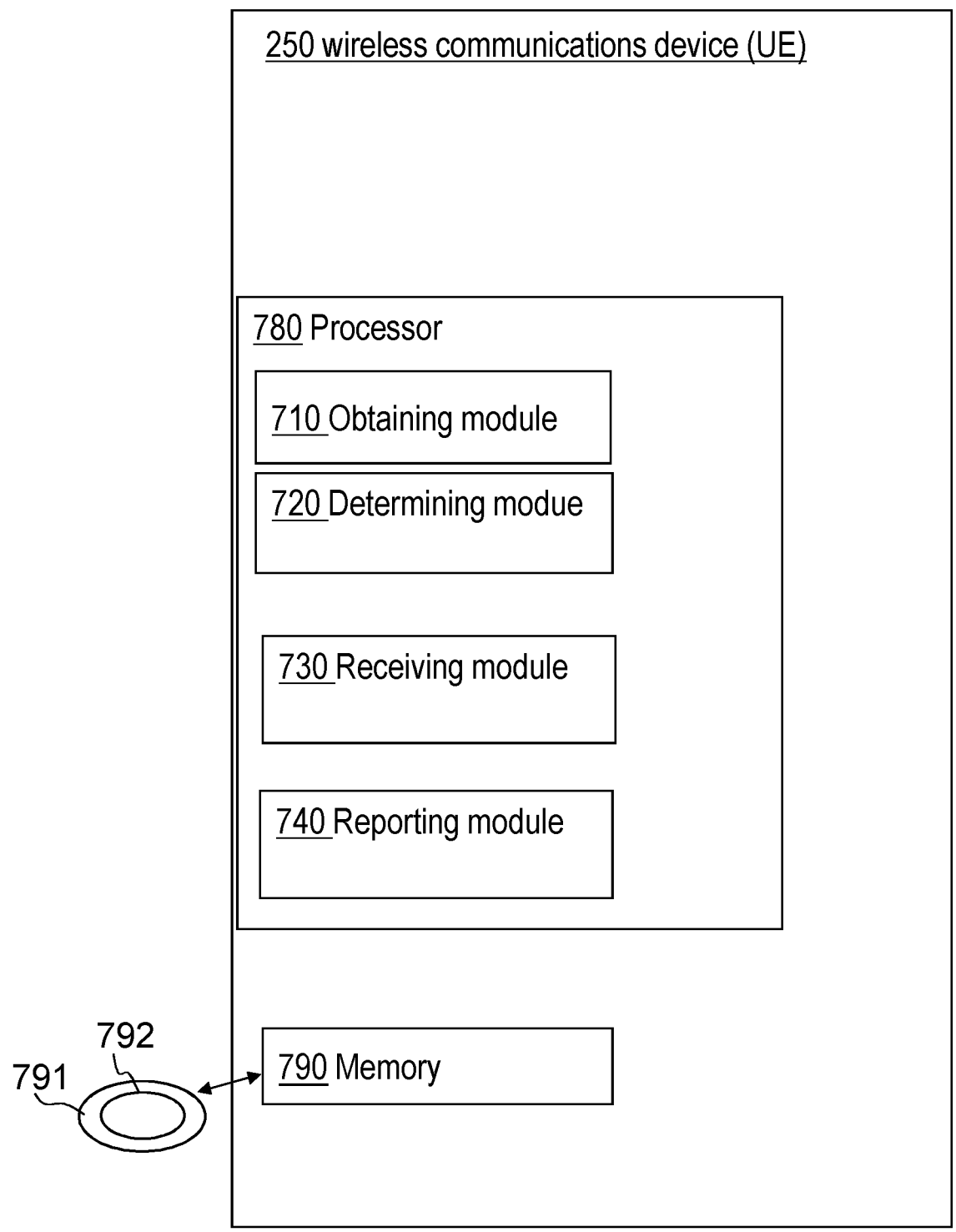
FIG. 7 is a schematic block diagram illustrating embodiments of a wireless communication device.
Figure 8:
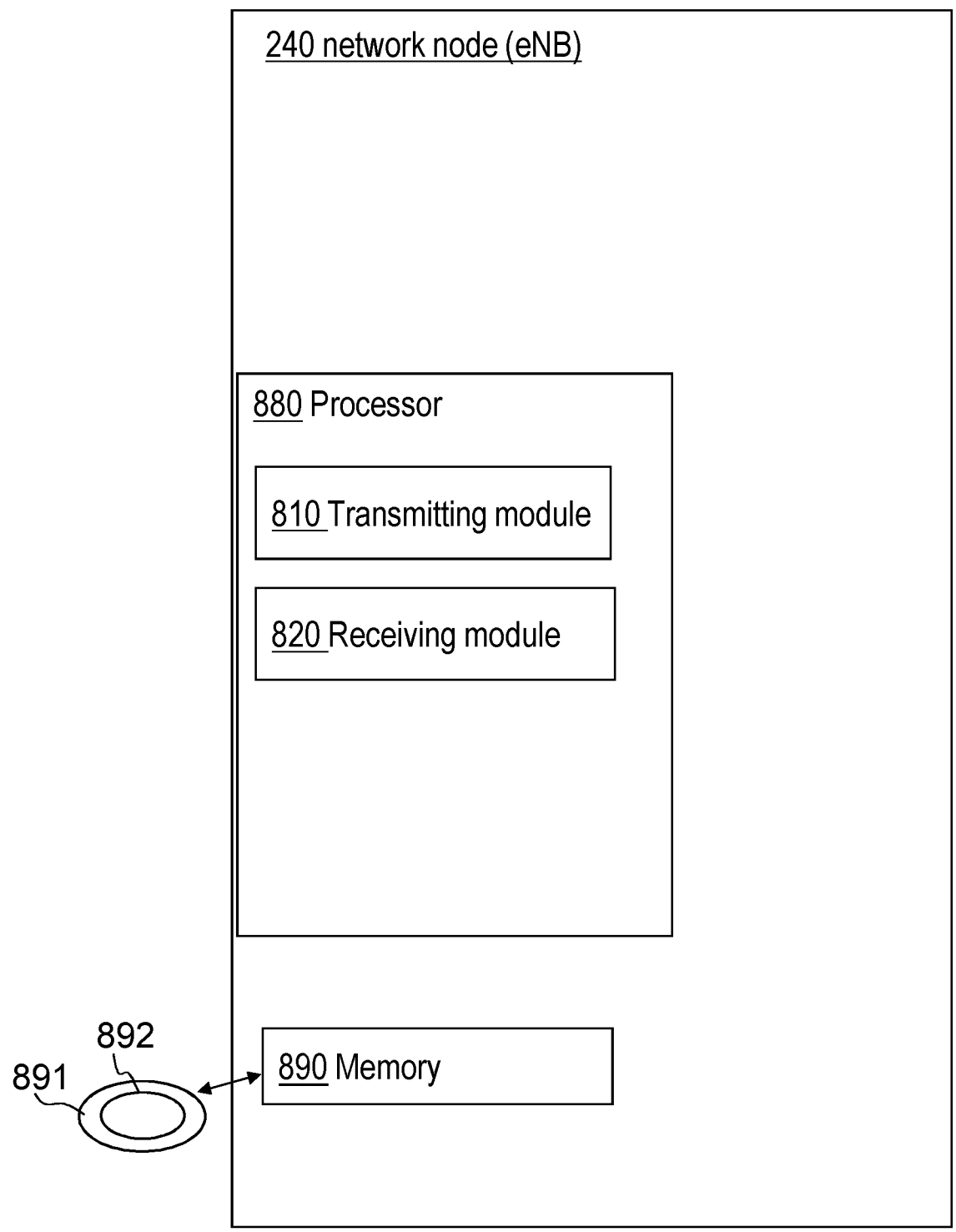
FIG. 8 is a schematic block diagram illustrating embodiments of a network node.

The embodiments herein may be implemented through one or more processors, such as the processor 780 in the wireless communications device 250 depicted in FIG. 7, and the processor 880 in the network node 240 depicted in FIG. 8 together with computer program code for performing the functions and actions of the embodiments herein.

The program code mentioned above may also be provided as a computer program product, for instance in the form of a data carrier 791, 891, carrying computer program code 792, 892, for performing the embodiments herein when being loaded into the wireless communications device 250 and the network node 240.

One such carrier may be in the form of a CD ROM disc. It is however feasible with other data carriers such as a memory stick. The computer program code may furthermore be provided as pure program code on a server and downloaded to the wireless communications device 250 and network node 240.

Thus, the methods according to the embodiments described herein for the wireless communications device 250 and the network node 240 may be implemented by means of a computer program product, comprising instructions, i.e., software code portions, which, when executed on at least one processor, cause the at least one processor to carry out the actions described herein, as performed by the wireless communications device 250 and the network node 240. The computer program product may be stored on a computer-readable storage medium. The computer-readable storage medium, having stored there on the computer program, may comprise the instructions which, when executed on at least one processor, cause the at least one processor to carry out the actions described herein, as performed by the wireless communications device 250 and the network node 240. In some embodiments, the computer-readable storage medium may be a non-transitory computer-readable storage medium.

The wireless communications device 250 and the network node 240 may further each comprise a memory 790, 890, comprising one or more memory units. The memory 790, 890 is arranged to be used to store obtained information such as identifiers of APs and WLANs, measurements of signals from radio access network nodes, measurement reports or parts thereof and applications etc. to perform the methods herein when being executed in the wireless communications device 250 and the network node 240.

As mentioned above, it is an object of embodiments herein to improve the performance of one or more wireless communications networks.

According to some first embodiments herein, the object is achieved by a method performed by the wireless communications device 250 for measurement reporting procedures.

E.g. the method is used for excluding one or more radio access network nodes from measurement reporting. The exclusion from measurement reporting may comprise not triggering a report for such a WLAN comprising the one or more radio access network nodes, and/or not include results for such a WLAN in an actual measurement report.

The wireless communications device 250 is capable of operating in the first wireless communications network 201 and in the second wireless communications network 202. The first wireless communications network 201 uses a first RAT. The second wireless communications network 202 uses a second RAT.

The wireless communications device 250 may obtain one or more identifiers 450 of radio access network nodes 211a, 211b, 212a, 212b. The one or more identifiers 450 of radio access network nodes 211a, 211b, 212a, 212b may each be an identifier of one or more radio access network nodes. The one or more radio access network nodes 211a, 211b, 212a, 212b operate in the first wireless communications network 201. The wireless communication device 250 may perform mobility between the identified one or more radio access network nodes 211a, 211b, 212a, 212b. The one or more identifiers 450 may be obtained from the network node 240 operating in the second wireless communications network 202.

The wireless communications device 250 may further determine that one or more out of the one or more radio access network nodes 211a, 211b, 212a, 212b identified by the obtained one or more identifiers 450 are to be excluded from measurement reporting to the network node 240 operating in the second wireless communications network 202.

According to some second embodiments herein, the object is achieved by a method performed by the network node 240 for assisting the wireless communications device 250 to perform measurement reporting procedures.

E.g. the method is used for assisting the wireless communications device 250 to exclude one or more radio access network nodes 211a, 211b, 212a, 212b from measurement reporting. The network node 240 operates in a second wireless communications network 202. The wireless communications device 250 is capable of operating in the second wireless communications network 202. The wireless communications device 250 is further capable of operating in a first wireless communications network 201. The first wireless communications network 201 uses a first RAT. The second wireless communications network 202 uses a second RAT.

The network node 240 may transmit one or more identifiers 450 of radio access network nodes 211a, 211b, 212a, 212b. The one or more identifiers 450 of radio access network nodes 211a, 211b, 212a, 212b may each be an identifier of one or more radio access network nodes 211a, 211b, 212a, 212b. The wireless communication device 250 may perform mobility between the one or more radio access network nodes 211a, 211b, 212a, 212b.

The transmitted identifier 450 of the radio access network node 211a, 211b, 212a, 212b is an indication that one or more out of the radio access network nodes 211a, 211b, 212a, 212b identified by the transmitted identifier 450 is to be excluded from measurement reporting to the network node 240.

According to some third embodiments herein, the object is achieved by the wireless communications device 250 configured to perform the method according to the first embodiments above.

According to some fourth embodiments herein, the object is achieved by a network node 240 configured to perform the method according to the second embodiments.

When using the word "comprise" or "comprising" it shall be interpreted as non-limiting, i.e. meaning "consist at least of".

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

Therefore, the above embodiments should not be taken as limiting the scope, which is defined by the appending claims.

Note that although terminology from 3GPP LTE/SAE and Wi-Fi has been used in this disclosure to exemplify the embodiments herein, this should not be seen as limiting the scope of the embodiments herein to only the aforementioned network types. Other wireless network types may also benefit from exploiting the ideas covered within this disclosure.

Also note that terminology such as a first radio access network node and a second radio access network node should be considered to be non-limiting and does in particular not imply a certain hierarchical relation between the two.

The invention claimed is:

1. A method of operation by a wireless communication device, the method comprising:

receiving signaling from a cellular network indicating a mobility set for the wireless communication device, the mobility set identifying, as mobility-set Access Points (APs), one or more Wireless Local Area Network (WLAN) APs among which the wireless communication device is permitted to perform WLAN connection mobility without need for further permission from the cellular network;

receiving a measurement configuration that excludes one or more of the mobility-set APs from consideration by the wireless communication with respect to WLAN measurement reporting by the wireless communication device back to the cellular network; and performing the WLAN measurement reporting according to the measurement configuration, by triggering WLAN measurement reporting only on reporting events not involving the one or more excluded mobility-set APs, and by omitting measurements for one or more of the one or more excluded mobility-set APs from WLAN measurement reports sent from the wireless communication device to the cellular network, at least for reporting instances where inclusion of the omitted measurements would have prevented the wireless communication device from also including measurements for one or more WLAN APs that are outside of the mobility set and satisfy a minimum signal threshold for measurement reporting.

2. The method of claim 1, wherein the method includes unconditionally omitting the measurements for the one or more excluded mobility-set AP.

3. The method of claim 1, wherein each WLAN measurement report has room for WLAN measurements for a limited number of WLAN APs and wherein, for a given WLAN measurement report, the wireless communication device does or does not include WLAN measurements for any one or more of the one or more excluded mobility-set APs, in dependence on whether a total number of WLAN APs currently detected by the wireless communication device as satisfying the minimum signal threshold exceeds the limited number.

4. The method of claim 1, wherein, with respect to any given reporting instance, the one or more excluded mobility-set APs are the mobility-set APs not currently used for serving the wireless communication device, such that the WLAN measurement report sent by the wireless communication device for the given reporting instance includes measurements for the mobility-set AP that is currently serving the wireless communication device and any other WLAN APs that are outside of the mobility set and currently satisfy a minimum signal threshold for reporting, subject to a limit on the total number of WLAN APs for which WLAN measurements can be included in the WLAN measurement report.

5. The method of claim 1, wherein the signaling indicating the mobility set comprises an indication of one or more WLAN identifiers and wherein the method includes the wireless communication device determining whether a detected WLAN AP belongs to the mobility set by comparing identification information received in beacon signaling from the detected WLAN AP with the one or more WLAN identifiers.

6. The method of claim 5, wherein the one or more WLAN identifiers comprise one or more SSIDs or BSSIDs, or a combination of one or more SSIDs and one or more BSSIDs.

7. The method of claim 1, wherein receiving the signaling indicating the mobility set comprises receiving a Radio Resource Control (RRC) message from a radio access node in the cellular network that conveys the indication.

8. A wireless communication device comprising:
   a processor; and
   a memory storing computer program instructions that, when executed by the processor, configures the wireless communication device to:
   receive signaling from a cellular network indicating a mobility set for the wireless communication device, the mobility set identifying, as mobility-set Access Points (APs), one or more Wireless Local Area Network (WLAN) APs among which the wireless communication device is permitted to perform WLAN connection mobility without need for further permission from the cellular network;
   receive a measurement configuration that excludes one or more of the mobility-set APs from consideration by the wireless communication with respect to WLAN measurement reporting by the wireless communication device back to the cellular network; and
   perform the WLAN measurement reporting according to the measurement configuration, by triggering WLAN measurement reporting only on reporting events not involving the one or more excluded mobility-set APs, and by omitting measurements for one or more of the one or more excluded mobility-set APs from WLAN measurement reports sent from the wireless communication device to the cellular network, at least for reporting instances where inclusion of the omitted measurements would have prevented the wireless communication device from also including measurements for one or more WLAN APs that are outside of the mobility set and satisfy a minimum signal threshold for measurement reporting.

9. The wireless communication device of claim 8, wherein the wireless communication device is configured to omit the measurements for the one or more excluded mobility-set APs unconditionally.

10. The wireless communication device of claim 8, wherein each WLAN measurement report has room for WLAN measurements for a limited number of WLAN APs and wherein, for a given WLAN measurement report, the wireless communication device is configured to include or exclude WLAN measurements for any one or more of the one or more excluded mobility-set APs, in dependence on whether a total number of WLAN APs currently detected by the wireless communication device as satisfying the minimum signal threshold exceeds the limited number.

11. The wireless communication device of claim 8, wherein, with respect to any given reporting instance, the one or more excluded mobility-set APs are the mobility-set APs not currently used for serving the wireless communication device, such that the WLAN measurement report sent by the wireless communication device for the given reporting instance includes measurements for the mobility-set AP that is currently serving the wireless communication device and any other WLAN APs that are outside of the mobility set and currently satisfy a minimum signal threshold for reporting, subject to a limit on the total number of WLAN APs for which WLAN measurements can be included in the WLAN measurement report.

12. The wireless communication device of claim 8, wherein the signaling indicating the mobility set comprises an indication of one or more WLAN identifiers and wherein the wireless communication device is configured to determine whether a detected WLAN AP belongs to the mobility set by comparing identification information received in beacon signaling from the detected WLAN AP with the one or more WLAN identifiers.

13. The wireless communication device of claim 12, wherein the one or more WLAN identifiers comprise one or more SSIDs or BSSIDs, or a combination of one or more SSIDs and one or more BSSIDs.

14. The wireless communication device of claim 8, wherein the wireless communication device is configured to receive the signaling indicating the mobility set comprises as a Radio Resource Control (RRC) message from a radio access node in the cellular network that conveys the indication.

* * * * *